C. W. SHERMAN.
FRICTION DRAFT GEAR.
APPLICATION FILED AUG. 13, 1917.
1,251,930.
Patented Jan. 1, 1918.
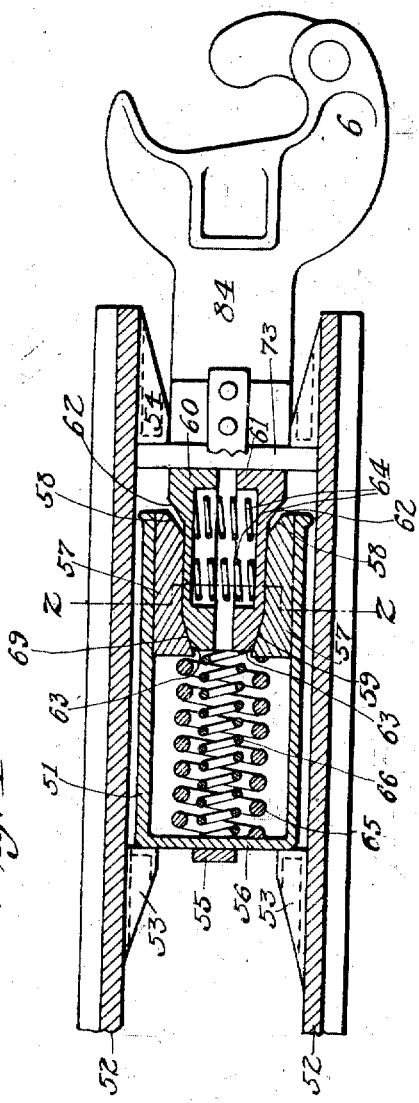
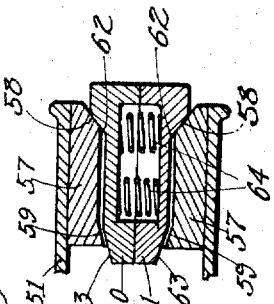
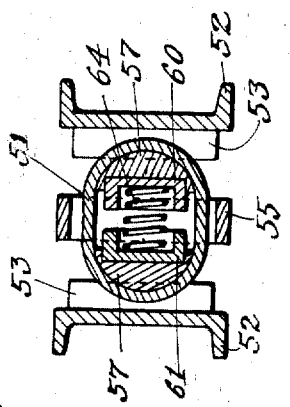
Inventor
Clifton W. Sherman
by Geyer & Popp
Attorneys

UNITED STATES PATENT OFFICE.

CLIFTON W. SHERMAN, OF BUFFALO, NEW YORK.

FRICTION DRAFT-GEAR.

1,251,930.  Specification of Letters Patent.  Patented Jan. 1, 1918.

Original application filed April 23, 1914, Serial No. 833,898. Divided and this application filed August 13, 1917. Serial No. 185,887.

*To all whom it may concern:*

Be it known that I, CLIFTON W. SHERMAN, a citizen of the United States, residing at Buffalo, in the county of Erie and State of New York, have invented new and useful Improvements in Friction Draft-Gears, of which the following is a specification.

This invention relates to friction draft gears such as are used in railway cars for relieving the same from the shock, jar and strains while coupling and drawing the cars.

The object of this invention is to provide a draft gear of this character in which the frictional surfaces are more effective and the frictional engagement of the frictional elements is distributed more uniformly over these elements.

This application is a division of an application filed by myself April 23, 1914, Serial No. 833,898.

In the accompanying drawings:

Figure 1 is a fragmentary horizontal longitudinal section showing a form of friction draft gear embodying my invention and showing the parts in the position which they occupy when the gear is in normal position. Fig. 2 is a vertical transverse section thereof taken in line 2—2, Fig. 1. Fig. 3 is a view similar to Fig. 2 but showing the parts in the position which they occupy when the gear is subjected to a buffing or pulling blow.

Similar characters of reference indicate corresponding parts in the several views.

51 represents a friction cylinder arranged lengthwise between two draft sills 52 and engaging its rear end with rear stops 53 on the sills. 73 represents a front follower arranged transversely between the sills and engaging its front side with two front stops 54 on the sills. 6 represents the coupler having a draw bar 84 engaging with the front side of the front follower and connected with a yoke 55 which extends lengthwise of the upper and lower sides of the cylinder and engaging with the rear head 56 thereof; 57 represents two friction shoes engaging their transversely outer sides with the bore of the cylinder and each provided at its front and rear ends with inclined faces 58, 59, the rear faces being inclined at an angle relatively to the axis of the cylinder which is more acute than the angle of the front faces. Between the friction shoes are arranged the two sections 60, 61 of a divided or split wedge each of which is provided at opposite ends of its transversely outer side with front and rear inclined faces 62, 63 which are of the corresponding angle as the front and rear inclined faces of the companion friction shoe and are adapted to engage therewith successively. These wedge sections are yieldingly held in a separated position crosswise of the cylinder by transversely operating spring means which preferably comprise two transverse springs 64 arranged between the opposing longitudinal faces of these wedge sections and seated at their opposite ends in recesses or pockets formed in these sections. 65 represents a heavy main spring interposed between the rear head of the cylinder and the rear ends of the friction shoes and 66 a comparatively light releasing spring interposed between said rear cylinder head and the rear ends of said wedge sections.

In the normal position of the parts the wedge sections are separated and in the outermost position in which the rear inclined faces of these sections engage with the rear inclined faces of the shoes and the front inclined faces of those sections are out of engagement with the front inclined faces of the shoes, as shown in Fig. 1.

During the initial part of the inward movement of the wedge sections under a buffing or pulling blow, the friction shoes are held practically at rest by the resistance of the main spring 65 and the frictional engagement of the same due to the lateral pressure of the springs 64. This enables the wedging engagement of the rear or inner coöperating faces of the shoes and wedge sections which operate on a relatively acute angle to press the shoes with great force against the cylinder and produce a powerful gripping engagement between these parts. When the wedge sections have moved inwardly far enough to cause the acute inner inclined faces of the same to move, these sections toward each other so that they nearly engage each other then the outer or front inclined faces of the shoes and wedge sections engage each other, as shown in Fig. 3, causing the wedge sections to engage each other, and as the angle of the last mentioned faces is less acute or more blunt the same have less tendency to further spread the shoes but more of a tendency to push the same inwardly. As this inward movement of the shoes is resisted by the longitudinal springs and the frictional contact between the cylinder and shoes, an effective cushioning of the blow against the car is produced both when pulling or pushing the same.

I claim as my invention:

1. A frictional draft gear comprising a member having a friction surface, a set of friction shoes in frictional engagement with said member, a wedge movable forwardly and rearwardly between the several shoes, longitudinally operating spring means which resist the rearward movement of said friction shoes and wedge, and transversely operating spring means which are flexed by the rearward movement of said wedge relatively to said shoes and cause the latter to be pressed transversely against said friction member, said wedge having an inclined rear part which engages a similar rear part on said shoes and an inclined front part which engages a similar front part on said shoes, the angle of wedging engagement of said rear parts being more acute than the angle of wedging engagement of said front parts.

2. A friction draft gear comprising a friction member having a friction surface, a set of friction shoes engaging frictionally with said member, a wedge movable forwardly and rearwardly between said shoes and composed of a plurality of sections, longitudinally operating spring means resisting the rearward movement of said shoes and wedge, and transversely operating spring means arranged between said wedge sections and resisting movement of said wedge sections transversely toward each other, those parts of said wedge sections and shoes nearer the longitudinally operating spring means having a wedging engagement the angle of which is comparatively acute and those parts of said wedge sections and shoes remoter from said longitudinally operating spring means having a wedging engagement the angle of which is comparatively obtuse.

CLIFTON W. SHERMAN.